April 9, 1946. W. P. WILLS 2,398,341
CONTROL APPARATUS
Filed Nov. 14, 1944 2 Sheets-Sheet 1

INVENTOR.
WALTER P. WILLS
BY
G. B. Spangenberg
ATTORNEY.

April 9, 1946.   W. P. WILLS   2,398,341
CONTROL APPARATUS
Filed Nov. 14, 1944   2 Sheets-Sheet 2

*INVENTOR.*
WALTER P. WILLS
BY
*ATTORNEY.*

Patented Apr. 9, 1946

2,398,341

UNITED STATES PATENT OFFICE 2,398,341

CONTROL APPARATUS

Walter P. Wills, Philadelphia, Pa., assignor to The Brown Instrument Company, Philadelphia, Pa., a corporation of Pennsylvania Application November 14, 1944, Serial No. 563,413

22 Claims. (Cl. 172—239)

The present invention relates to systems for reproducing at a distance electrical, mechanical, and other magnitudes including departures or displacements of devices in general.

A general object of the invention is to provide improvements in systems for the remote control of a movable receiver member.

A specific object of the invention is to provide an improved telemetering system having transmitting and receiving units which are interconnected by a two-conductor transmission circuit and wherein the movable receiver member is adjusted in position by so-called power-set means.

It is also an object of the invention to provide such an improved telemetering system which is characterized by its extreme accuracy in adjusting the receiver member into correspondence with the position of the movable transmitter member.

A further object of the invention is to provide such a telemetering system which inherently operates to automatically compensate for the disturbing influence of external factors, such as variation in the energizing voltage supply lines, on the accuracy of the remote positioning of the movable receiver member.

An object of the invention also is to provide such an improved telemetering system, the accuracy of which is independent of and unaffected by variation of the length of the transmission circuit. Thus the telemetering system of my invention may be utilized in applications requiring various lengths of transmission circuits without any modification of the transmitting and receiving units.

It is also an object of the invention to provide an improved system for reproducing magnitudes, departures or displacements of a plurality of devices at a distance simultaneously and to provide an indication and/or permanent record of the ratio between the various magnitudes, departures or displacements.

In accordance with the present invention there is provided a transmitter and a receiver interconnected by a two-conductor transmission circuit. One conductor, if desired, may comprise the earth. In one embodiment of the invention the transmitter includes an alternating voltage source and an adjustable impedance element which may be dominantly resistive, inductive, or capacitive in character and associated switching means for alternately and in rapid succession impressing on the transmission circuit voltage impulses of opposite polarity, one of the voltage impulses varying in amplitude in accordance with the variations in the value of a variable magnitude it is desired to reproduce at a distance and the other of the voltage impulses being substantially constant in amplitude. To this end the operation of the switching means is synchronized with the frequency of alternation of the source of alternating current at the transmitter so that one of the voltage impulses is impressed on the transmission circuit during one half cycle of the alternating current source and the other voltage impulse is impressed on the transmission circuit during the other half cycle.

At the receiver an adjustable circuit arrangement is provided for responding to the succession of voltage impulses of opposite polarity received over the transmission circuit to produce a unidirectional output of one polarity or of the opposite polarity accordingly as the amplitude of the variable voltage impulses deviates in one direction or the other from a predetermined value depending upon the adjustment of the adjustable circuit arrangement. In order to accomplish this result the adjustable circuit arrangement includes two capacitive reactance elements and a pair of inversely connected half wave rectifiers or diodes which are so arranged with respect to the capacitive reactance elements and the transmission circuit conductors that the succession of voltage impulses of one polarity received over the transmission circuit from the transmitter are impressed on one of the capacitive reactance elements to charge the latter while the succession of the voltage impulses of opposite polarity received over the transmission circuit from the transmitter are impressed on the other of the capacitive reactance elements. In this manner a voltage is established on one of the capacitive reactance elements which is of substantially constant amplitude and a voltage is established on the other of the capacitive reactance elements which is variable in accordance with the variations in value of the variable magnitude, departure or displacement it is desired to reproduce at the receiver.

In order to utilize the substantially constant and variable voltages produced across the capacitive reactance elements to derive a unidirectional voltage output of one polarity or of opposite polarity accordingly as the amplitude of the variable voltage impulses deviates from said predetermined value, the adjustable circuit arrangement also is provided with a Wheatstone bridge network, one arm of which includes one of the capacitive reactance elements and an adjacent arm of which includes the other of the capacitive reactance elements. An adjustable impedance element, which desirably is resistive in character, comprises the remaining two arms of the bridge network. This adjustable impedance element is arranged to permit tapping off at a point intermittent the end terminals a potential representative of the adjustment of the impedance. When the adjustment of the impedance corresponds to the value of the magnitude under reproduction at the receiver, that potential is the same as the potential of the point of engagement of the capacitive reactance elements and the bridge network is then balanced.

Upon departure of the magnitude under reproduction from the said predetermined value, the charge established on the capacitive reactance element upon which the variable voltage impulses are impressed will be changed a corresponding amount. As a consequence the potential of the point of engagement of the two capacitive reactance elements is rendered different than the potential of the point tapped off the adjustable impedance of the bridge network. The amount by which the said potentials differ from each other depends upon the extent of the departure of the magnitude under reproduction from the said predetermined value. The difference in polarity of the two potentials is determined by the direction of departure of the magnitude under reproduction.

The unidirectional potential of one polarity or of opposite polarity so derived at the output terminal of the Wheatstone bridge network is translated by suitable conversion means into an alternating voltage of one phase or of opposite phase with respect to the phase of an alternating voltage source provided at the receiver. The derived alternating voltage is amplified by an electronic amplifier and the amplified quantity is impressed on one phase winding of a two phase reversible rotating field motor, the other phase winding of which is connected to and receives energizing current from the alternating voltage source last mentioned. A mechanical coupling or connection is provided between the shaft of the reversible motor and the adjustable impedance of the Wheatstone bridge network so that upon bridge network unbalance and consequent motor rotation the adjustable impedance is adjusted in the proper direction and by the amount necessary to rebalance the bridge network. When the adjustable impedance has been so adjusted, the adjustment thereof is representative of the value of the magnitude or departure or displacement under reproduction. Desirably suitable indicating and/or recording means are associated with the adjustable impedance for providing an indication or record of the value under reproduction.

It is a feature of the present invention that the adjustable impedance provided at the transmitter may be either resistive, inductive, or capacitive in character. Thus the adjustable impedance element may desirably comprise a pair of end to end coils through which an associated magnetic armature is adapted to be moved for deriving the voltage impulses of variable amplitude. An adjustable impedance of this character is desirable in certain applications wherein the available actuating force of the variable magnitude or departure or displacement is small and it is desired therefore to eliminate or minimize any posibility of friction. Such an adjustable impedance element has especial utility when the arrangement of the present invention is employed to measure and record at a distance the variations in the flow of fluid through a conduit.

It is a further feature of the invention that the structure embodying it, when employed for flow metering and telemetering purposes, is readily adaptable for providing a linear indication and/or record of the rate of fluid flow through the conduit. This result may be obtained even though the adjustment of the magnetic armature into and out of the end to end coils of the adjustable impedance at transmitter is a non-linear, for example, a square root function of the rate of flow of the fluid through the conduit.

Another and especially important feature of the present invention is its ready adaptability for the remote indication or recordation of the ratio between the amplitudes of two variable magnitudes or departures or displacements. When it is desired to utilize the principles of the present invention for this purpose, the voltage impulses transmitted to the receiver during one half cycle of alternating voltage at the transmitter are made to vary in accordance with one of the variable magnitudes it is desired to reproduce at the receiver and the other voltage impulses impressed on the transmission circuit during the opposite half cycle of alternating voltage source at the transmitter are made to vary in accordance with the second of the variable magnitudes. Accordingly, the voltage established on one of the capacitive reactance elements at the receiver is representative of the amplitude of one of the voltage impulses and the voltage established on the other of the capacitive reactance elements is representative of the second of the voltage impulses. Hence, the adjustment of the adjustable impedance element of the receiver at which the Wheatstone bridge network is balanced is representative of the ratio of the amplitudes of the two magnitudes under reproduction. As those skilled in the art will recognize, such embodiment of my invention has especial utility for the remote indication and/or recording of the fuel-air ratio of a furnace.

The apparatus of the present invention is characterized in that it requires the use of only two conductors, one of which may comprise the earth, between the transmitter and receiver units. It is further characterized in that variations in the length of the two conductors have no adverse effect on the accuracy of the receiver in reproducing the variable magnitude or magnitudes under reproduction. A further feature of the invention is that variations in the voltage amplitudes of the alternating current sources provided at the transmitter and receiver are not effective to disturb the operation of the system, nor are differences or variations in the phase of the alternating voltage at the receiver and transmitter operative to disturb the system operation. Moreover, the system is characterized in that the frequency and voltage of the alternating voltages supplied at the transmitter and receiver need not be the same.

The various features of novelty which characterize this invention are pointed out with particularity in the claims annexed to and forming a part of this specification. For a better understanding of the invention, however, its advantages and specific objects attained with its use, reference should be had to the accompanying drawings and descriptive matter in which is illustrated and described a preferred embodiment of the invention.

Figures 1, 2, 3, 5, 7, 8:
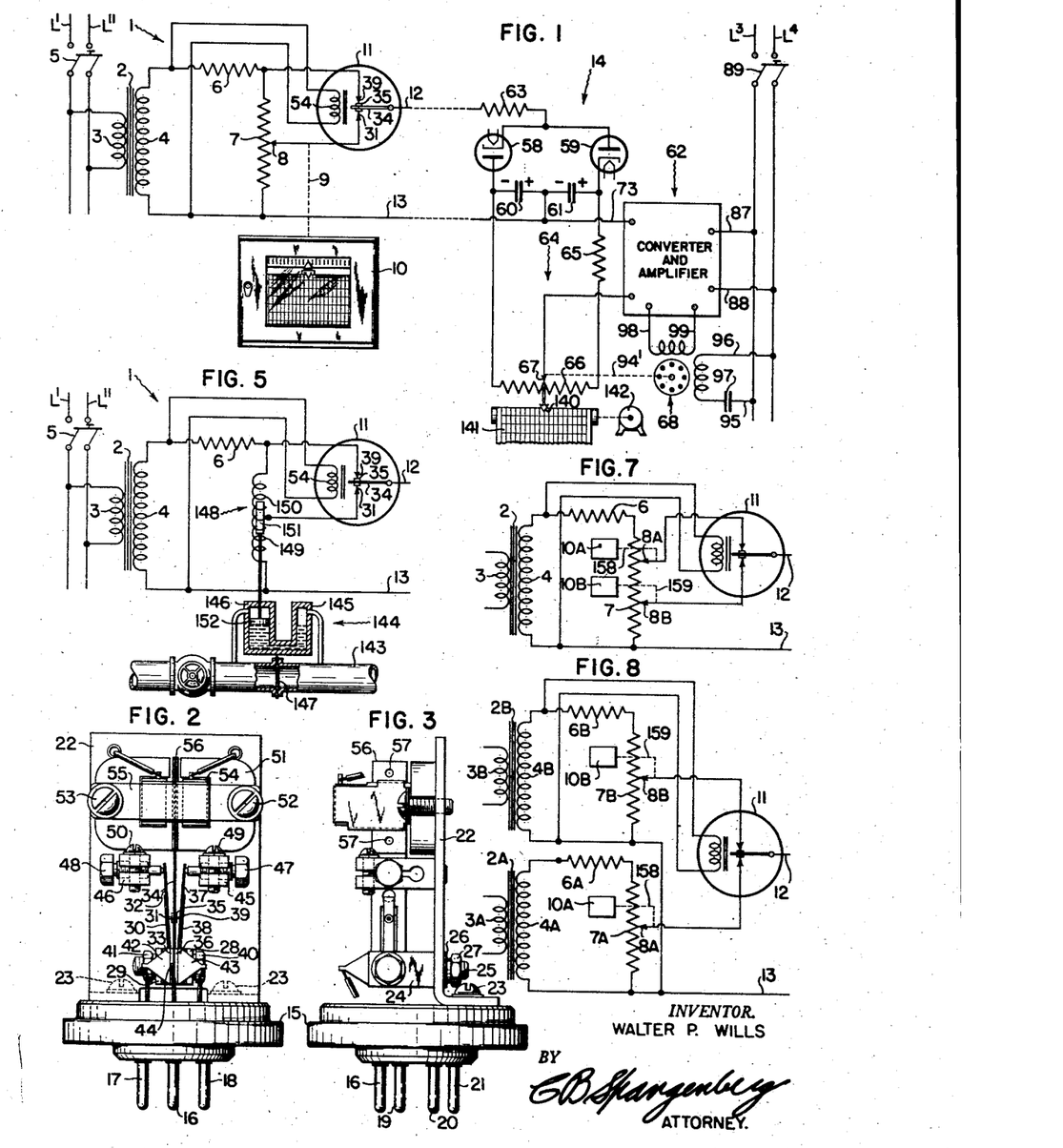
Fig. 1 diagrammatically illustrates one embodiment of the present invention.
Figs. 2 and 3 illustrate in detail one form of switching device which may be employed in the arrangement of Fig. 1.
Fig. 5 illustrates a modification of the transmitter unit of the arrangement of Fig. 1 having utility for the remote indication and/or recording of the rate of flow of fluid through a conduit.
Figs. 7 and 8 illustrate a further modification of the transmitter unit of Fig. 1 for adapting the telemetering system of Fig. 1 for the remote indication of the ratio between two variable magnitudes.

Referring to Fig. 1, a transmitter unit indicated generally by the reference character 1 is provided which includes a transformer 2 having a primary winding 3 and a secondary winding 4. The terminals of the primary winding 3 are connected by means of a double pole-single throw switch 5 and supply lines L' and L'' to a source of alternating current. The supply lines L' and L'' may desirably supply alternating current of commercial frequency, for example 60 cycles per second, to the transformer primary winding 3. It will be understood, however, that the frequency of the alternating current supplied to the transformer primary winding 3 by the supply lines L' and L'' is not critical, nor is the voltage.

The terminals of the transformer secondary winding 4 are connected by means of a resistance 6 to the terminals of a slidewire resistance 7 provided with a contact 8 which is in slidable engagement with the resistance 7. The contact 8 may be suitably coupled, for example, mechanically as illustrated by the dotted line 9, to the movable element of an instrument indicated at 10 which is responsive to the variable magnitude or departure or displacement it is desired to reproduce at a distance. Instrument 10, for example, may be operated by a float, a thermocouple, a Bourdon tube, bi-metallic element or any other condition responsive element. It will be apparent that, if desired, the contact 8 may be manually adjusted along the length of the resistance 7.

Transmitter unit 1 is also provided with a single pole-double throw switching device indicated at 11 for alternately and in rapid succession connecting the upper terminal of the resistance 7 and the contact 8 to a conductor 12 comprising one conductor of a transmission circuit connecting the transmitter unit 1 to a receiver unit indicated generally at 14 and which is located at a distance from the transmitter unit. The lower terminal of resistance 7 is connected by a conductor 13 which comprises the other conductor of the transmission circuit leading to the receiver 14. If desired the conductor 13 may comprise the earth.

Switching device 11 illustrated schematically in Fig. 1 and in greater detail in Figs. 2 and 3 is so arranged as to operate in synchronism with the alternating voltage established across the resistance 7 so that when the device 11 connects the upper end terminal of resistance 7 to the conductor 12 and thereby to the receiver 14, a voltage impulse of one polarity is impressed on the transmission circuit, and when the device 11 connects the contact 8 to the transmission circuit conductor 12, a voltage impulse of opposite polarity is impressed on the transmission circuit. Accordingly, voltage impulses of opposite polarity are impressed on the transmission circuit and conveyed thereby to the receiver unit 14 during the successive half cycles of the alternating voltage supplied by the alternating current supply lines L' and L''.

The switching device 11 illustrated in Figs. 2 and 3 is of the type shown and claimed in application Serial No. 421,176, filed by Frederick W. Side on December 1, 1941. The switch 11 is provided with a base 15 in which are mounted terminals 16, 17, 18, 19, 20, and 21. A plate 22 is secured to the base 15 by means of screws 23. A stud 24 provided with a screw-threaded extension 25 is secured to the lower end of plate 22 by means of a lock washer 26 and a nut 27. The free end of the stud 24 is bifurcated having spaced apart ends 28 and 29. Located between the spaced ends 28 and 29 are an insulating pad (not shown), a spring contact arm 30 carrying a contact 31, a resilient stop 32, an insulating pad 33, a vibrating reed 34 carrying a contact 35, an insulating pad 36, a resilient stop 37, a spring contact arm 38 carrying a contact 39 and an insulating pad (not shown). These elements are all clamped between the spaced apart ends 28 and 29 by a bolt 40 and a nut 41. The spring contact arms 30 and 38 are provided with ears 42 and 43, respectively, which are electrically connected to the terminals 17 and 18 respectively. The vibrating reed 34 is provided with an ear 44 which is electrically connected to the terminal 16. Riveted to the supporting plate 22 are also studs 45 and 46 which carry adjustable stops in the form of screws 47 and 48 formed of insulating material. When the adjustable stops 47 and 48 have been adjusted as desired, they are clamped in place by means of screws 49 and 50, respectively. The spring contact arm 38 carrying the contact 39 through its own resiliency engages the resilient stop 37 and the resilient stop 37 through its own resiliency engages the adjustable stop 47. In like manner, the spring contact arm 30 engages the resilient stop 32 which in turn engages the adjustable stop 48. By adjusting the adjustable stops 47 and 48, the positions of contacts 39 and 31 may be individually adjusted with respect to the contact 35 carried by the vibrating reed 34.

A permanent magnet 51 is secured to the supporting plate 22 by screws 52 and 53. A coil 54 is held in place by a bracket 55 which, in turn, is secured in place by the screws 52 and 53. The end of the vibrating reed 34 is disposed within the coil 54 and is provided with an armature 56 which is riveted to the vibrating reed 34 by rivets 57, as seen in Fig. 3.

The coil 54 is energized with alternating current and acts on the armature 56 to vibrate the reed 34 at 60 cycles per second when the alternating current supplied by the alternating current supply lines L' and L'' is 60 cycles per second to cause the contact 35 to engage and disengage with contacts 39 and 31 at the same frequency. As shown in Fig. 1, the terminals of coil 54 are connected across the transformer secondary winding 4. If desired, separate transformer means may be provided between coil 54 and the supply lines L' and L''. The permanent magnet 51 operates in conjunction with the coil 54 and the armature 56 in such a manner as to cause the armature 56 to vibrate in synchronism with the alternating current supplied by means L' and L". By adjusting the adjustable stops 47 and 48, and hence the contacts 39 and 31, the wave form produced by the contacts 31, 35 and 39 may be adjusted to the desired value and shape. The contacts 31 and 39 are preferably so arranged that when the contact 35 is in its stationary position, it engages both contacts 39 and 31. This provides an overlapping action which compensates for wear of the contacts and also contributes to the elimination of stray electrical effects on the operation of the apparatus. Due to this overlapping action also, wear of contacts does not materially alter the wave form produced by the contacts. By mounting the contacts 31 and 39 on the spring contact arms 30 and 38 respectively, good wiping contact is at all times provided by the contact 35 and the contacts 31 and 39. A cover (not shown) may desirably be provided for enclosing the movable parts of the switching device. Such a cover may be held in place on the base 15 by means of a rolled flange clamping the cover to the base. Such a cover will act to prevent dirt and corrosive atmosphere from affecting the parts of the switching device.

The switching device 11 is essentially a polarizing switching mechanism, the operating winding 54 and the permanent magnet 51 cooperating to vibrate the reed 34 at 60 cycles per second in synchronism with the 60 cycle alternating current supplied. For purposes of explanation it may be assumed that the contact 39 is engaged by the contact 35 during the first half cycle of the alternating current supply when the voltage of the upper terminal of resistance 7 is positive and the contact 31 is engaged by the contact 35 during the second half cycle when the voltage of the upper terminal of resistance 7, and thereby the voltage of the contact 8, is negative with respect to the lower terminal of resistance 7. Accordingly, the contacts 35 and 39 engage when the voltage of the upper terminal of resistance 7 is positive with respect to the potential of the lower terminal and the contacts 35 and 31 engage when the voltage of the contact 8 is negative with respect to the voltage of the lower terminal of resistance 7. When the vibrating reed 34 is stationary in its mid position, both contacts 31 and 39 will be engaged by the contact 35 so that when the vibrating reed is operated, the contact 35 is always in engagement with one or the other of contacts 31 and 39.

As shown in Fig. 1, the receiver unit 14 is provided with a pair of inversely connected halfwave rectifiers or diodes indicated at 58 and 59 and an associate pair of capacitive reactance elements indicated at 60 and 61. The diodes 58 and 59 are of the indirectly heated type and the heater filaments thereof are supplied with energizing current from any suitable source, and for example, may be supplied with energizing current from a transformer provided in the converter and amplifier unit indicated generally at 62. The connections to the heater filaments have not been shown in order to avoid complicating of the drawings. The cathode of the diode 58 is connected directly to the anode of the diode 59 and these elements are connected by means of a resistance 63 to the transmission circuit conductor 12. The transmission circuit conductor 13 is connected to adjacent terminals of the capacitive reactance elements 60 and 61, the other terminal of capacitive reactance element 60 being connected to the anode of the diode 58 and the other terminal of capacitive reactance element 61 being connected to the cathode of the diode 59.

With this arrangement the diode 58 is rendered conductive to permit a charging current flow to the capacitive reactance element 60 during the half cycle of the alternating voltage supplied by the means L' and L" at the transmitter when the contact 35 of the switching device 11 is in engagement with the contact 31 and thereby connects the transmission circuit conductor 12 to the slidable contact 8. In this manner a unidirectional voltage is established on the capacitive reactance element 60 which varies in amplitude in accordance with the position of the contact 8 along the length of the slidewire resistance 7. The capacitive reactance element 60 preferably is of such magnitude that it is capable of retaining the charge impressed thereon for at least several cycles of the alternating voltage supplied by the lines L' and L". The polarity of the voltage established on the capacitive reactance element 60 is such as to render the terminal in engagement with the anode of the diode 58 negative with respect to its other terminal.

The diode 59, on the other hand, is operative to conduct during the opposite half cycles of voltage supplied by lines L' and L" at the transmitter, or in other words when the contact 35 of the switching device 11 is in engagement with the contact 39 and connects the upper terminal of the resistance 7 to the transmission circuit 12. During these half cycles the upper terminal of the resistance 7 is positive with respect to the lower terminal thereof so that a pulse of current flows through the diode 59 to charge the capacitive reactance element 61 with the polarity shown in Fig. 1. The voltage to which the capacitive reactance element 61 is so charged is of substantially constant amplitude inasmuch as the voltage impressed on the diode 59 and the capacitive reactance element 61 is substantially constant. The capacitive reactance element 61 also is of magnitude sufficient to retain the charge impressed thereon for at least several cycles of the voltage supplied by the mains L' and L" at the transmitter.

Thus a voltage of amplitude variable in accordance with the position of contact 8 along the length of the slidewire resistance 7 is established across the capacitive reactance element 60, and a voltage of substantially constant amplitude is established across the capacitive reactance element 61. Moreover, the arrangement is such that when the contact 8 is in its upper extreme position along the length of the slidewire resistance 7 the voltage established across the capacitive reactance element 60 is of the same magnitude as that established across the capacitive reactance element 61. As the contact 8 is adjusted in a downward direction from its upper extreme position, the voltage established across the capacitive reactance element 60 gradually decreases with respect to the voltage established across the capacitive reactance element 61.

As shown, the capacitive reactance elements 60 and 61 each comprise one arm of a Wheatstone bridge network indicated generally by the reference numeral 64. Another arm of the bridge network 64 is comprised of a fixed resistance 65 and a variable part of a slidewire resistance 66 depending upon the adjustment along the resistance 66 of a contact 67. The remaining arm of the bridge network comprises the remaining part of the slidewire resistance 66. Preferably the resistance 65 is of the same ohmic magnitude as the overall resistance of the slidewire resistance 66. Consequently, when the contact 8 of the transmitter unit is in its extreme upper position along the length of the resistance 7 and the voltages across the capacitive reactance elements 60 and 61 are identical, the potential of the point of engagement of the slidewire resistance 66 and the resistance 65 will be the same as the potential of the point of engagement of the capacitive reactance elements 60 and 61. Accordingly, in such case the bridge network 64 will be in its balanced position when the contact 67 is in its extreme position to the right along the length of slidewire resistance 66. Upon adjustment of the contact 8 at the transmitter in a downward direction along the length of the slidewire resistance 7, the voltage across the capacitive reactance element 60 will be correspondingly reduced. The bridge network 64 will then be rebalanced when the contact 67 is adjusted to a new position to the left along the length of slidewire resistance 66 at which the potential of the contact 67 is the same as that of the point of engagement of the capacitive reactance elements 60 and 61.

In accordance with the present invention the contact 67 is adjusted along the length of slidewire resistance 66 by means including the converter and amplifier indicated at 62 as required to maintain the bridge network 64 in its balanced condition. Upon adjustment of the contact 8 along the length of slidewire resistance 7 in the transmitter, a unidirectional potential of one polarity or the other depending upon the direction of adjustment of contact 8 along the resistance 7 is produced between the contact 67 and the point of engagement of capacitive reactance elements 60 and 61. The magnitude of this potential is variable in accordance with the extent of adjustment of the contact 8 along the resistance 7. This unidirectional potential so derived therefrom the bridge network 64 is impressed on the converter and amplifier 62 wherein it is translated into an alternating current of one phase or of opposite phase, which alternating current is amplified and utilized to control the selective actuation for rotation in one direction or the other of a reversible electrical rotating field motor indicated generally by the reference character 68. The shaft of motor 68 is mechanically coupled in any convenient manner to the contact 67 so that upon motor rotation the contact 67 is adjusted along the length of the slidewire resistance 66 as required to rebalance the bridge network 64.

Figure 4:
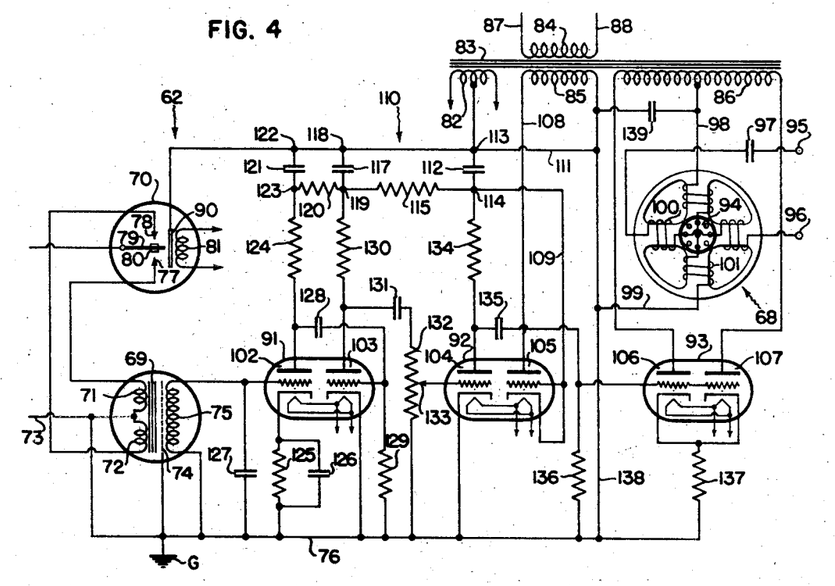
Fig. 4 shows in detail the wiring diagram of the converter and the electronic amplifier and motor drive system of the arrangement of Fig. 1.

The converter and amplifier 62 and the motor 68 shown schematically in Fig. 1 are illustrated in more detail in Fig. 4. As shown in Fig. 4 the converter and amplifier 62 includes a transformer 69 and a switching device or vibrator 70 which are operative to convert the unidirectional unbalanced voltage derived from the bridge network 64 into an alternating current of one phase or of opposite phase which may be readily amplified and employed to control the selective actuation of the reversible motor 68 for rotation in one direction or the other.

The transformer 69 includes a primary winding comprising two sections 71 and 72, the adjacent terminals of which are connected together and by a conductor 73 to the point of engagement of the capacitive reactance elements 60 and 61. The core structure and casing of transformer 69 and a shield 74 interposed between the transformer primary winding and its secondary winding 75 are connected to a grounded conductor 76. The remote ends of the terminals of the primary winding sections 71 and 72 are connected to the stationary contacts 77 and 78, respectively, of the vibrator 70. The latter includes a vibrating reed 79 carrying a contact 80 moved by the vibration of the reed back and forth between the contacts 77 and 78 which it alternately engages. The vibrator 70 may desirably be of the same construction as the switching device 11 illustrated schematically in Fig. 1 and shown in more detail in Figs. 2 and 3.

The reed 79 of the vibrator 70 is caused to vibrate by a winding 81 having its terminals connected to the secondary winding 82 of a transformer 83. The transformer 83 is provided with a primary winding 84 and additional secondary windings 85 and 86. The terminals of the primary winding 84 are connected by conductors 87 and 88 to alternating current supply lines L₃ and L₄, as seen in Fig. 1. The supply lines L₃ and L₄ may desirably supply alternating current of commercial frequency to the transformer primary winding 84. It will be understood that the frequency and voltage of the alternating voltage supplied by the means L₃ and L₄ need not necessarily be the same as the frequency and voltage of alternating current supplied to the transmitter 1 by the means L' and L" although, if desired, the said frequency and voltages may be identical. Preferably a switch 89 is inserted between mains L₃ and L₄ and the transformer primary winding 84.

A permanent magnet 90 is associated with the reed 79 of the vibrator 70 for polarizing and synchronizing purposes and in operation the reed 79 is in continuous vibration at a frequency corresponding to that of the frequency of supply lines L₃ and L₄. In consequence the current flow alternating through the primary winding sections 71 and 72 of transformer 69 creates an alternating voltage in the secondary winding 75 which is well adapted for amplification in the electronic amplifying and control apparatus which has its input terminals connected to the terminals of the transformer secondary winding 75.

Said electronic apparatus comprises an amplifying section and a motor drive section, both of which receive energizing current from the transformer 83. The amplifying section includes electronic amplifying tubes 91 and 92 while the motor drive section comprises an electronic tube 93 and a reversible rotating field motor 68.

The motor 68, as diagrammatically shown, comprises a rotor 94 having its shaft mechanically connected, as illustrated by the dotted line 94' in Fig. 1, to the contact 67 in slidable engagement with the resistance 66. The motor 68 has a pair of terminals 95 and 96 connected through a condenser 97 of suitable value to the alternating current supply conductors L₃ and L₄ and has a second pair of terminals 98 and 99 connected respectively to the mid point of the secondary winding 86 and to one end terminal of the secondary winding 85 of the transformer 83. For its intended use the motor 68 may be of the form schematically shown in the drawing in which one pair of oppositely disposed field poles are surrounded by a winding 100 connected between the motor terminals 95 and 96 and the other pair of poles are surrounded by a winding 101 connected between the terminals 98 and 99.

Due to the action of the condenser 97 the current flow through the motor winding 100 will lead the voltage of the alternating current supply conductors L₃ and L₄ by approximately 90°.

The current supplied to the winding 101 thereby is approximately in phase with or displaced 180° from the voltage supplied by the alternating current supply conductors L₃ and L₄. The windings 100 and 101 thus establish fields in the rotor 94 which are displaced from one another approximately 90° in one direction or the other depending upon whether the winding 101 is energized with current in phase with the voltage of alternating current supply conductors L₃ and L₄ or displaced 180° in phase therefrom. As will become apparent from the subsequent description the phase of the current flow through the winding 101 and the direction of rotation of the rotor 94 depend upon and are controlled by the direction of the unbalance of the Wheatstone bridge network 64 and the duration of said rotor rotation depends upon the duration of said unbalance so that the rotation of the rotor operates to adjust the contact 67 to the proper extent as well as in the proper direction to rebalance the bridge network 64.

The alternating voltage created in the secondary winding 75 of the transformer 69 is amplified through the action of the amplifying tubes 91 and 92 and the amplification thus effected is utilized in energizing the phase winding 101 of the motor 68 to control the selective actuation of the latter for rotation of the rotor 94 in one direction or the other.

As shown, the electronic amplifying tube 91 includes two heater type triodes enclosed in the same envelope and designated by the reference symbols 102 and 103. The triode 102 includes anode, control electrode, cathode, and heater filament elements and the triode 103 includes like elements. The filaments of triodes 102 and 103 are connected in parallel and receive energizing currents from the low voltage secondary winding 82 of the transformer 83. The conductors through which the secondary winding 82 supplies current to the heater filaments of the electronic tube 91 and also to the heater filaments of the tubes 92 and 93 have been omitted to simplify the drawings.

The electronic amplifying tube 92 includes two heater type triodes designated by the reference characters 104 and 105 and contained in the same envelope. Both of the triodes include anode, control electrode, cathode and heater filament elements. The electronic tube 93 also includes two heater type triodes designated by the reference characters 106 and 107 and enclosed in the same envelope and each including anode, control electrode, cathode and heater filament elements.

The triode 105 of electronic valve 92 is utilized as a halfwave rectifier providing direct current voltage for energizing the anode or output circuits of the triodes 102, 103, and 104. As shown, the control electrode and cathode of the triode 105 are directly connected to each other and the output circuit thereof is energized by the transformer secondary winding 85 through a circuit which may be traced from the left end terminal of the winding 85 through a conductor 108 to the anode of the triode 105, the cathode thereof and through a conductor 109 to the positive terminal of a filter generally designated by the reference numeral 110. The negative terminal of the filter 110 is connected by a conductor 111 to the right end terminal of the transformer secondary winding 85.

The filter 110 includes a condenser 112 which operates to smooth out the ripple in the output voltage of the filter between the points 113 and 114. The filter 110 also includes a resistance 115 and a condenser 117 which smooths out the output voltage of the filter between the points 118 and 119. The filter 110 also includes a further resistance 120 and a condenser 121 for smoothing out the output voltage between the filter points 122 and 123. The filter therefore comprises three stages and is provided because for satisfactory and efficient operation it is desirable that the anode voltage supplied to the triode 102 be substantially free from ripple whereas it is not necessary to supply anode voltage so completely free from ripple to the output circuit of the triode 103. Likewise, it is not necessary to supply anode voltage as free from ripple to the triode 104 as to the triode 103.

The anode circuit of the triode 102 may be traced from the filter point 123 through a fixed resistance 124 to the anode of triode 102 to the cathode and through a cathode biasing resistance 125 shunted by a condenser 126 to the negative filter point 113 through the previously mentioned grounded conductor 76. The cathode biasing resistance 125 and the parallel connected condenser 126 are utilized for biasing the control electrode of the triode 102 negatively with respect to the cathode.

The input circuit of the triode 102 may be traced from the cathode through the parallel connected resistance 125 and condenser 126 through the transformer secondary winding 75 to the control electrode of the triode 102. A condenser 127 is provided in parallel with the secondary winding 75 for tuning the latter. The output circuit of the triode 102 is resistance capacity coupled to the input circuit of the triode 103 by means of a condenser 128 and a resistance 129. In particular, the anode of the triode 102 is connected by condenser 128 to the control electrode of the triode 103 and the said control electrode is connected through the resistance 129 to the conductor 76 and thereby to the cathode of the triode 103. The anode circuit of the triode 103 may be traced from the positive terminal 119 of the filter 110 through a fixed resistance 130 to the anode of the triode 103, the cathode and conductors 76 and 111 to the negative terminal 113 of the filter.

The output circuit of the triode 103 is resistance capacity coupled to the input circuit of the triode 104 by means of a condenser 131 which is connected between the anode of the triode 103 and the control electrode of triode 104, and by means of a resistance 132 which is connected between the control electrode of the triode 104 and the cathode thereof.

It is noted that the resistances 129 and 132 which are connected in the input circuits of the triodes 103 and 104, respectively, operate to maintain the control electrodes of the triodes 103 and 104 at the same potentials as their associated cathodes when no voltage is induced in the transformer secondary winding 75, and upon the induction of an alternating voltage in the secondary winding 75, resistances 129 and 132 permit the flow of grid current between the control electrodes of the triodes 103 and 104 and the associated cathodes and thereby limit the extent to which the control electrodes are permitted to go positive with respect to their associated cathodes. With the control electrode of triode 104 connected to the resistance 132 by an adjustable contact 133, as shown, said resistance and contact form a means for varying the amount of the signal impressed on the control electrode of the triode 104 from the anode circuit of the triode 103.

The anode circuit of triode 104 may be traced from the positive terminal 114 of the filter 110 through a fixed resistance 134 to the anode of the triode, the cathode thereof, and the conductors 76 and 111, to the negative terminal 113 of the filter. The output circuit of the triode 104 is resistance capacity coupled to the input circuits of the triodes 106 and 107 by means including a condenser 135 and a resistance 136. The condenser 135 is connected to each of the control electrodes of the triodes 106 and 107 and is connected to the cathodes of those triodes through the resistance 136. The signal voltage from the output circuit of the triode 104 therefore is impressed simultaneously and equally on both of the control electrodes of triodes 106 and 107.

Anode voltage is supplied to the output circuits of the triodes 106 and 107 from the high voltage secondary winding 86 of the transformer 83. The anode of the triode 106 is connected to the left end terminal of the transformer secondary winding 86 and the anode of the triode 107 is connected to the right end terminal of said winding 86. The cathodes of triodes 106 and 107 are connected together and through a fixed resistance 137 and a conductor 138 to the terminal 99 of the motor 101. The terminal 98 of the motor winding 101 is connected to a center tap on the transformer secondary winding 86. Thus, the triodes 106 and 107 are utilized to supply energizing current to the phase winding 101 of the motor 68. A condenser 139 of suitable value is connected in parallel with the winding 101 for tuning the latter.

During the first half cycle of alternating voltage produced across the terminals of the transformer secondary winding 86, the anode of the triode 106 is rendered positive with respect to the center tap of the winding 106 and during a second half cycle the anode of the triode 107 is made positive with respect to the said center tap. Accordingly, the triodes 106 and 107 are arranged to conduct on alternate half cycles of the alternating current supplied by the supply conductors L3 and L4.

When no signal is impressed on the control electrodes of the triodes 106 and 107, pulsating unidirectional current of twice the frequency of the alternating voltage supplied by conductors L' and L'' is impressed on the motor winding 101. The motor 68 is not urged to rotation in either direction when so energized but remains stationary. When an alternating signal is impressed on the control electrodes of the triodes 106 and 107, the magnitude of the pulses of current flowing in the anode circuit of one triode 106 or 107 will be increased while the magnitude of the pulses of current flowing in the anode circuit of the other triode will be decreased. Accordingly, the pulses of unidirectional current supplied to the motor winding 101 during the first half cycle will predominate over those supplied the motor winding during the second half cycle. Which anode current will be increased depends upon whether the signal voltage is in phase with or 180° out of phase with the voltage of the supply conductors L3 and L4.

Such energization of the motor winding 101 operates to introduce therein an alternating component of current of the same frequency as that supplied by the alternating current supply conductors L3 and L4. This alternating component of current will either lead or lag by 90° the alternating current flowing through the motor winding 100 depending upon which of the triodes 106 and 107 has its anode current increased by the prevailing signal voltage and with either phase relation the two currents produce a magnetic field in the motor core structure which rotates in one direction or the other depending upon the said current phase relation and effects rotation of the motor rotor 94 in the corresponding direction.

In normal operation the signal voltage impressed on the control electrode of the triodes 106 and 107 through their connection by condenser 135 to the anode circuit of the triode 104 is dependent in magnitude and phase upon the magnitude and direction of the pulsating current flow through the detector circuit including the vibrator 70 and primary winding sections 71 and 72 of the transformer 69.

The converter and amplifying and motor driving device 62 for selectively controlling the rotation of motor 68 is described in detail and is being claimed in a copending application of Walter P. Wills, the present applicant, filed on December 1, 1941, and bearing Serial No. 421,173. Accordingly, further description of the converter amplifier and motor drive arrangements herein is believed unnecessary.

If desired, a pen 140 may be mechanically coupled to the shaft of motor 68 and arranged in cooperative relation with a recorder chart 141 to thereby provide a continuous record at the receiver 14 of the motion imparted to the contact 8 at the transmitter 1 by the instrument 10. To his end, the pen 140 may be made rigid with the contact 67 or may be independently driven by the motor 68, as, for example, by means of a separate cable or other drive. The chart 141 may be a strip chart, as shown, and is adapted to be driven in any convenient manner as, for example, by a unidirectional motor 142 through suitable gearing (not shown) so that a record of the movement of the contact 8 along the slidewire resistance 7 in the transmitter will be recorded as a continuous line on the chart 141 at the receiver.

In Fig. 5 I have illustrated, more or less diagrammatically, a modification of the transmitter 1 of the arrangement of Fig. 1 having especial utility for measuring and remotely exhibiting the flow of fluid through a conduit 143. There is shown in Fig. 5 a manometer 144 having opposed legs 145 and 146 partially filled with mercury and upon the respective legs of which are impressed pressures correspondingly varying with the up and down stream pressures respectively across an orifice 147 inserted in the conduit 143. The level of mercury in the leg 146 accordingly varies with the rate of flow in the conduit 143 and in particular varies in accordance with a square root function of the rate of flow. An inductive reactance element indicated generally at 148 is provided to measure the level variations.

The inductive reactance element 148 is employed in the arrangement of Fig. 5 in lieu of the slidewire resistance 7 and associated contact 8 of the arrangement of Fig. 1 and includes a pair of end to end coils 149 and 150 which are placed one above the other. An armature 151, carried by a float 152 resting on the mercury in leg 146, is adapted to be moved into and out of the coils 149 and 150 in accordance with the variations in the up and down stream pressures across the orifice 147. As the armature 151 is moved up and down, the inductive reactance of coil 150 is increased and decreased respectively relatively to the inductive reactance of the coil 149. As a consequence, the potential of the point of engagement of the coils 149 and 150 is made to vary in accordance with the position of the armature 151 and hence, in accordance with a square root function of the rate of fluid flow through the conduit 143.

Energizing voltage is supplied to the inductive reactance element 148 from the alternating current supply lines L' and L'' through the transformer 2. Specifically, the lower terminals of coil 149 and of the transformer secondary winding 4 are directly connected together and the upper terminals of the coil 150 and of the transformer secondary winding 4 are connected through the resistance 6.

In this embodiment of my invention, as in the embodiment disclosed in Fig. 1, a switching device 11 is provided for alternately and in rapid succession impressing on the transmission circuit including conductors 12 and 13 a voltage corresponding to the voltage across the entire inductive reactance element 148 and a voltage corresponding to that across only a portion of the inductive reactance element 148, namely that across the coil 149. To this end the vibrating reed 34 operates to alternately connect the upper terminals of the coils 149 and 150 to the transmission circuit conductor 12. The operation of the switching device 11 is synchronized with the frequency of the alternating voltage impressed across the inductive reactance element 148, and therefore, the voltage impressed on the transmission circuit during the half cycles when the reed 34 connects the upper terminal of coil 150 to the conductor 12 is one polarity while the voltage impressed on the transmission circuit is of the opposite polarity when the reed 34 connects the upper terminal of coil 149 to the conductor 12.

The operation of this embodiment of my invention thus is substantially identical to that of the arrangement of Fig. 1. Upon change in the position of the armature 151 relatively to the coils 149 and 150, the Wheatstone bridge network 64 in the receiver 14 is unbalanced in one direction or the other depending upon the direction of motion of the armature 151 and to an extent depending upon the extent of motion of the armature 151. Accordingly, the reversible motor 68 is actuated for rotation in the proper direction and in the required amount to effect the necessary adjustment of the contact 67 along the length of the slidewire resistance 66 to rebalance the bridge network 64. With this modification of my invention, therefore, the record obtained on the chart 141 is indicative of the rate of fluid flow through the conduit 143.

While the record obtained on the chart 141 is representative of the rate of flow through the conduit 143, the record obtained, however, does not vary linearly with the rate of flow of fluid through the conduit for the reason that the motion imparted to the armature 151 is a square root function of the rate of fluid flow. In some instances it is desirable to have the record produced on the chart 141 vary linearly with respect to the rate of fluid flow and this result can be accomplished by the use of suitable means for causing the motion of the pen 140 to move in accordance with a square root function of the motion of the armature 151 in and out of the coils 149 and 150. This result can be obtained by the use of a suitably configured cam between the shaft of the motor 68 and the pen 140.

Figure 6:
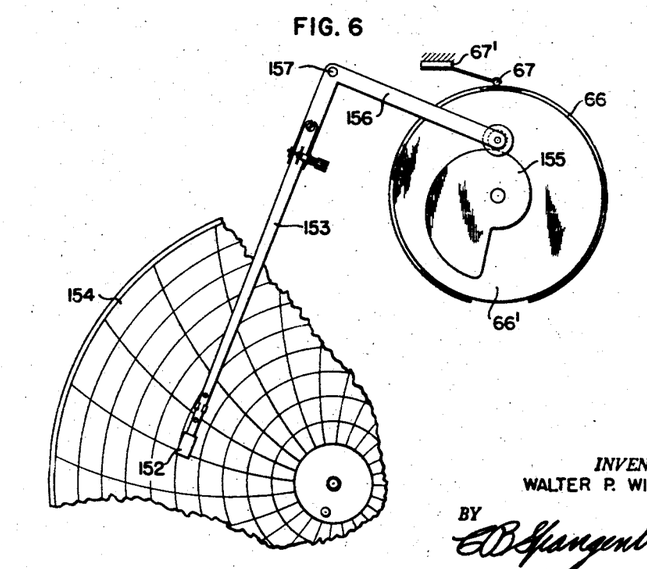
Fig. 6 is a view partially broken away illustrating one means for extracting square root so that the movable receiver member of the telemetering system of Fig. 5 is operative to provide a linear indication or record of the rate of flow of fluid through the conduit.

In Fig. 6 I have illustrated one such means which may be employed for causing the motion of the recording pen relatively to a chart to be in accordance with a linear function of the rate of flow of fluid through the conduit 143. In Fig. 6 a pen 158 carried on the end of a pen arm 153 is disposed in cooperative relation with a circular chart 154. The chart 154 is shown partially broken away in Fig. 6 in order not to confuse the drawings. The pen arm 153 is angularly positioned by the reversible motor 68 in Fig. 6 by means of a cam 155 which is secured to the shaft of the motor 68 through suitable gear mechanism. A cam follower 156 pivoted at 157 and rigid with the pen arm 153 is also provided. Thus, upon angular motion of the cam follower 156 about the pivot 157 the pen arm 153 is moved over the chart 154. The cam 155 is given a non-linear shape corresponding to the relation existing between the rate of fluid flow through the conduit 143 and the motion of the armature 151 relatively to the coils 149 and 150 so that the pen arm 153 is positioned in linear relation to the rate of fluid flow through the conduit 143.

In Fig. 6 the slidewire resistance 66 has been shown as being disposed on the circumference of a circular disc 66' of insulating material and the contact 67 as being mounted on a stationary support 67'. Preferably, the disc 66' is made rigid with the cam 155 so that upon rotation of motor 68 the bridge network 64 is given a rebalancing adjustment and a corresponding adjustment is given to the pen 152 along the chart 154. The chart 154 is provided with suitable supporting means (not shown) and also with suitable means for rotating the chart at a desired speed.

While I have illustrated the use of a suitably configured cam for causing the record obtained on a circular chart to vary in linear accordance with the rate of fluid flow through the conduit 143, it will be understood that similar means may be employed to make the record obtained on a strip chart to vary linearly with the rate of fluid flow.

In Figs. 7 and 8 I have illustrated, more or less diagrammatically, further modifications embodying my invention and having especial utility for remotely exhibiting the ratio between two variable conditions. As those skilled in the art understand, there are some applications where it is desired to obtain knowledge as to the ratio between two magnitudes or departures or displacements. In such applications the absolute value of either one of the variables is not the factor of interest and it is desired only to obtain knowledge as to the ratio between the values of the variables. For example, in certain combustion control applications, knowledge as to the ratio between the amount of fuel and air supplied to a furnace is often useful and is desired. The modifications of my invention shown in Figs. 7 and 8 are of especial utility in such applications.

As shown in Fig. 7, a pair of separate contacts 8A and 8B are disposed in engagement with the slidewire resistance 7 at the transmitter 1 and are adapted to be separately moved along the length of the resistance. The contact 8A may be suitably coupled, for example, mechanically as indicated by the dotted line 158, to the movable element of an instrument 10A responsive to the rate of fuel supply to a furnace (not shown). The contact 8B may be suitably coupled, for example, mechanically as indicated by the dotted line 150, to the movable element of an instrument 10B responsive to the rate of air supply to the same furnace. Thus, the contact 8A is moved along the length of the resistance 7 in accordance with the rate of fuel supply to the furnace and the contact 8B is moved along the length of the resistance 7 in accordance with the rate of air supply to the furnace. The receiver employed with a transmitter of this construction may be identical to the receiver 14 shown in Fig. 1 except that the resistance 65 may desirably be omitted. Such omission is desirable inasmuch as both of the voltage impulses transmitted to the receiver with this modification may assume maximum and minimum values depending upon the adjustment of the contacts 8A and 8B along the length of resistance 7. The operation of this embodiment of my invention is otherwise the same as that of the arrangement of Fig. 1. Preferably, the chart at the receiver, with this modification, is suitably calibrated to indicate directly the fuel-air ratio.

In the modification disclosed in Fig. 8, separate slidewire resistances, indicated respectively by the characters 7A and 7B, are provided for each of the variable magnitudes. Thus the contact 8A associated with the instrument 10A is arranged to be moved relatively to a slide wire resistance 7A and the contact 8B associated with the instrument 10B is adapted to be moved relatively to a slidewire resistance 7B. A transformer 2A having a primary winding 3A and a secondary winding 4A is provided for establishing an alternating energizing voltage across the resistance 7A. Desirably, a resistance 6A is inserted in the energizing circuit, as shown. Similarly a transformer 2B having a primary winding 3B and a secondary winding 4B is provided for establishing an alternating energizing voltage across the slidewire resistance 7B. The energizing circuit to the slidewire resistance 7B includes a resistance 6B. The transformer primary windings 3A and 3B may be connected in parallel to the alternating current supply lines L' and L'' through a switch 5. The construction of the receiver and the operation of this modification of my invention may be substantially identical to that of the arrangement of Fig. 7.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent, is:

1. A system including an electrical network, means to alternately impress on said network voltage impulses of opposite polarity, at least one of said impulses varying in amplitude in accordance with the changes in a variable condition, said network including adjustable means selectively responsive to said voltage impulses to produce an undulating voltage of one phase or of opposite phase accordingly as the amplitude of said variable voltage impulses increases or decreases from a predetermined value determined by the adjustment of said adjustable means, and means responsive to the phase of said undulating voltage to adjust said adjustable means to reduce said undulating voltage.

2. A system including an electrical network, means to alternately impress on said network voltage impulses of opposite polarity, one of said impulses varying in amplitude in accordance with the changes in a variable condition and the amplitude of the other of said impulses being relatively constant, said network including adjustable means selectively responsive to the relative amplitudes of said impulses to produce an undulating voltage of one phase or of opposite phase accordingly as the amplitude of said variable voltage impulses increases or decreases from a predetermined value determined by the adjustment of said adjustable means, and means responsive to the phase of said undulating voltage to adjust said adjustable means to reduce said undulating voltage.

3. A system including an electrical network, means to alternately impress on said network voltage impulses of opposite polarity, the amplitude of each of said impulses varying in accordance with the changes of an associated variable condition, said network including adjustable means selectively responsive to said voltage impulses to produce an undulating voltage of one phase or of opposite phase accordingly as the amplitudes of each of said variable voltage impulses increase or decrease from a predetermined value determined by the adjustment of said adjustable means, and means responsive to the phase of said undulating voltage to adjust said adjustable means to reduce said undulating voltage.

4. A system including an electrical network, means to alternately impress on said network voltage impulses of opposite polarity, the amplitude of each of said impulses varying in accordance with the changes in an associated variable condition, said network including adjustable means selectively responsive to the relative amplitudes of said voltage impulses to create a unidirectional voltage of one polarity or of the opposite polarity accordingly as change occurs in one direction or the other in the relative amplitudes of said variable voltage impulses from a predetermined value determined by the adjustment of said adjustable means, means to translate said unidirectional voltage into an alternating voltage of one phase or of opposite phase according to the polarity of said unidirectional voltage, and means selectively responsive in one sense or in another sense according to the phase of said alternating voltage to adjust said adjustable means to reduce said unidirectional voltage.

5. A system including an electrical network, means to alternately impress on said network voltage impulses of opposite polarity, the amplitude of at least one of said voltage impulses being variable, said network including a bridge circuit having connected in each of two adjacent arms a capacitive reactance element, a pair of rectifier elements connected in said network and so arranged with respect to said capacitive reactance elements that the voltage impulses of one polarity are operative to charge one of said capacitive reactance elements and the voltage impulses of the opposite polarity are operative to charge the other of the capacitive reactance elements to thereby control the state of balance of said bridge circuit, and means operative upon unbalance of said bridge circuit to rebalance said bridge circuit.

6. A system including an electrical network, means to alternately impress on said network voltage impulses of opposite polarity, the amplitude of at least one of said voltage impulses being variable, said network including a bridge circuit having connected in each of two adjacent arms a capacitive reactance element, a pair of rectifier elements included in said network and so arranged with respect to said capacitive reactance elements that the voltage impulses of one polarity are operative to charge one of said capacitive reactance elements and the voltage impulses of the opposite polarity are operative to charge the other of the capacitive reactance elements to thereby create at the normally equi-potential terminals of said bridge circuit a unidirectional voltage of one polarity or of the opposite polarity depending upon the direction of change in the amplitudes of said variable voltage impulses, means to translate said unbalanced unidirectional voltage into an alternating voltage of one phase or of opposite phase according to the polarity of said unidirectional voltage, and means selectively responsive in one sense or in another sense according to the phase of said alternating voltage to rebalance said bridge circuit.

7. A system including an electrical network, means to alternately impress on said network voltage impulses of opposite polarity including an electrical impedance, means to create an alternating voltage drop across said impedance and switching means operative to alternately impress on said network the voltage drops across two portions of said impedance during alternate half cycles of said alternating voltage, said network including adjustable means selectively responsive to said voltage impulses to produce an undulating voltage of one phase or of opposite phase accordingly as the relative amplitudes of said variable voltage impulses increase or decrease from a predetermined value depending upon the adjustment of said adjustable means, and means responsive to the phase of said undulating voltage to adjust said adjustable means to reduce said undulating voltage.

8. A system including an electrical network, means to alternately impress on said network voltage impulses of opposite polarity including an electrical impedance, means to create an alternating voltage drop across said impedance and switching means operative to alternately impress on said network the voltage drops across two portions of said impedance during alternate half cycles of said alternating voltage, said network including adjustable means selectively responsive to the relative amplitudes of said voltage impulses to produce a unidirectional voltage of one polarity or of the opposite polarity accordingly as the relative amplitudes of said variable voltage impulses increase or decrease from a predetermined value depending upon the adjustment of said adjustable means, means to translate said unidirectional voltage into an alternating voltage of one phase or of opposite phase according to the polarity of said unidirectional voltage, and means selectively responsive in one sense or in another sense according to the phase of said alternating voltage to adjust said adjustable means to reduce said unidirectional voltage.

9. A system including an electrical network, means to alternately impress on said network voltage impulses of opposite polarity including a resistance and a contact in slidable engagement with said resistance, means to produce an alternating current flow through said resistance, and switching means synchronized with the frequency of said alternating current through said resistance and operative in one position to connect the end terminals of said resistance to said network and operative in another position to connect said contact and one of the end terminals of said resistance to said network, said network including adjustable means selectively responsive to said voltage impulses to produce an undulating voltage of one phase or of opposite phase accordingly as the relative amplitudes of said voltage impulses increase or decrease from a predetermined value determined by the adjustment of said adjustable means, and means responsive to the phase of said undulating voltage to adjust said adjustable means to reduce said undulating voltage.

10. A system including an electrical network, means to alternately impress on said network voltage impulses of opposite polarity including a resistance and a contact in slidable engagement with said resistance, means to produce an alternating current flow through said resistance, and switching means synchronized with the frequency of said alternating current through said resistance and operative in one position to connect the end terminals of said resistance to said network and operative in another position to connect said contact and one of the end terminals of said resistance to said network, said network including a bridge circuit having connected in each of two adjacent arms thereof a capacitive reactance element, a pair of rectifier elements included in said network and so arranged with respect to said capacitive reactance elements that the voltage impulses of one polarity are operative to charge one of said capacitive reactance elements and the voltage impulses of the opposite polarity are operative to charge the other of the capacitive reactance elements to thereby control the state of balance of said bridge circuit, and means operative on unbalance of said bridge circuit to rebalance said bridge circuit.

11. A system including an electrical network, means to alternately impress on said network voltage impulses of opposite polarity including a pair of end to end coils and an associated magnetic armature movable into and out of said coils in accordance with the changes in a variable condition, means to create an alternating current flow through said end to end coils, and switching means synchronized with the frequency of the alternating current flow through said end to end coils and operative in one position to connect the remote terminals of said end to end coils to said electrical network and operative in another position to connect the end terminals of one only of said coils to said electrical network, said network including adjustable means selectively responsive to said voltage impulses to produce an undulating voltage of one phase or of opposite phase accordingly as the relative amplitudes of said voltage impulses increase or decrease from a predetermined value determined by the adjustment of said adjustable means, and means responsive to the phase of said undulating voltage to adjust said adjustable means to reduce said undulating voltage.

12. A system including an electrical network, means to alternately impress on said network voltage impulses of opposite polarity including a pair of end to end coils and an associated magnetic armature movable into and out of said coils in accordance with the changes in a variable condition, means to create an alternating current flow through said end to end coils, and switching means synchronized with the frequency of the alternating current flow through said end to end coils and operative in one position to connect the remote terminals of said end to end coils to said electrical network and operative in another position to connect the end terminals of one only of said coils to said electrical network, said network including a bridge circuit having connected in each of two adjacent arms thereof a capacitive reactance element, a pair of rectifier elements included in said network and so arranged with respect to said capacitive reactance elements that the voltage impulses of one polarity are operative to charge one of said capacitive reactance elements and the voltage impulses of the opposite polarity are operative to charge the other of the capacitive reactance elements to thereby control the state of balance of said bridge circuit, and means operative on unbalance of said bridge circuit to rebalance said bridge circuit.

13. A system including an electrical network, means to alternately impress on said network voltage impulses of opposite polarity including a slidewire resistance and a pair of associated contacts in slidable engagement with said resistance means to create an alternating current flow through said slidewire resistance, and switching means synchronized with the alternating current flow through said resistance and operative in one position to connect one contact and one end terminal of said resistance to said network and operative in another position to connect the other contact and said one end terminal to said network, said network including adjustable means selectively responsive to said voltage impulses to produce an undulating voltage of one phase or of opposite phase accordingly as the relative amplitudes of said voltage impulses increase or decrease from a predetermined value determined by the adjustment of said adjustable means, and means responsive to the phase of said undulating voltage to adjust said adjustable means to reduce said undulating voltage.

14. A system including an electrical network, means to alternately impress on said network voltage impulses of opposite polarity including a slidewire resistance and a pair of associated contacts in slidable engagement with said resistance, means to create an alternating current flow through said slidewire resistance, and switching means synchronized with the alternating current flow through said resistance and operative in one position to connect one contact and one end terminal of said resistance to said network and operative in another position to connect the other contact and said one end terminal to said network, said network including a bridge circuit having connected in two adjacent arms thereof a capacitive reactance element, a pair of rectifier elements included in said network and so arranged with respect to said capacitive reactance elements that the voltage impulses of one polarity are operative to charge one of said capacitive reactance elements and the voltage impulses of the opposite polarity are operative to charge the other of the capacitive reactance elements to thereby control the state of balance of said bridge circuit, and means operative on unbalance of said bridge circuit to rebalance said bridge circuit.

15. A system including an electrical network, means to alternately impress on said network voltage impulses of opposite polarity including a pair of slidewire resistances and a contact in slidable engagement with each of said resistances, means to create an alternating current flow through each of said resistances, and switching means synchronized with an alternating current flow through each of said resistances and operative in one position to connect one end terminal of one of said resistances and the contact associated therewith to said network and operative in another position to connect one end terminal of the other of said resistances and the contact associated therewith to said network, said network including adjustable means selectively responsive to said voltage impulses to produce an undulating voltage of one phase or of opposite phase accordingly as the relative amplitudes of said voltage impulses increase or decrease from a predetermined value determined by the adjustment of said adjustable means, and means responsive to the phase of said undulating voltage to adjust said adjustable means to reduce said undulating voltage.

16. An electrical network selectively responsive to the relative amplitudes of voltage impulses of opposite polarity applied thereto including a bridge circuit having connected in each of two adjacent arms thereof a capacitive reactance element, a pair of rectifier elements associated with said bridge circuit and so arranged with respect to said capacitive reactance elements that the voltage impulses of one polarity are operative to charge one of said capacitive reactance elements and the voltage impulses of opposite polarity are operative to charge the other of the capacitive reactance elements whereby the state of balance of said bridge circuit is controlled in accordance with the relative amplitudes of said voltage impulses, and means operative on unbalance of said bridge circuit to rebalance said bridge circuit.

17. An electrical network selectively responsive to the relative amplitudes of voltage impulses of opposite polarity applied thereto including a bridge circuit having connected in each of two adjacent arms thereof a capacitive reactance element, a pair of rectifier elements associated with said bridge circuit and so arranged with respect to said capacitive reactance elements that the voltage impulses of one polarity are operative to charge one of said capacitive reactance elements and the voltage impulses of the opposite polarity are operative to charge the other of the capacitive reactance elements whereby the state of balance of said bridge circuit is controlled in accordance with the relative amplitudes of said voltage impulses and a unidirectional voltage of one polarity or of the opposite polarity is produced at the normally equi-potential terminals of said bridge network depending on direction of unbalance thereof, means to translate said unidirectional voltage into an alternating voltage of one phase or of opposite phase according to the polarity of said unidirectional voltage, and means selectively responsive in one sense or in another sense according to the phase of said alternating voltage to reduce said unidirectional voltage.

18. An electrical network selectively responsive to the relative amplitudes of voltage impulses of opposite polarity applied thereto including a bridge circuit two adjacent arms of which include a slidewire resistance and having connected in each of the other adjacent arms thereof a capacitive reactance element, a pair of rectifier elements associated with said bridge circuit and so arranged with respect to said capacitive reactance elements that the voltage impulses of one polarity are operative to charge one of said capacitive reactance elements and the voltage impulses of the opposite polarity are operative to charge the other of the capacitive reactance elements to thereby control the state of balance of said bridge circuit, and means operative on unbalance of said bridge circuit to adjust said slidewire resistance to rebalance said bridge circuit.

19. A telemetering system including a transmitter and a receiver, a transmission circuit connecting said transmitter and receiver, said transmitter including means to alternately impress on said transmission circuit voltage impulses of opposite polarity, the relative amplitudes of said voltage impulses being variable, said receiver including adjustable means selectively responsive to said impulses to produce an undulating voltage of one phase or of opposite phase accordingly as the relative amplitudes of variable voltage impulses increase or decrease from a predetermined value depending upon the adjustment of said adjustable means, and means responsive to the phase of said undulating voltage to adjust said adjustable means to reduce said undulating voltage.

20. The combination of claim 19 wherein said transmission circuit comprises two conducting wires.

21. A telemetering system including a transmitter and a receiver, a transmission circuit connecting said transmitter and receiver, said transmitter including means to alternately impress on said transmission circuit voltage impulses of opposite polarity, one of said voltage impulses varying in amplitude in accordance with the variations in magnitude of a variable condition and the other of said impulses being relatively constant in amplitude, said receiver including adjustable means selectively responsive to said impulses to produce an undulating voltage of one phase or of opposite phase accordingly as said variable voltage impulses increase or decrease from a predetermined value depending upon the adjustment of said adjustable means, and means responsive to the phase of said undulating voltage to adjust said adjustable means to reduce said undulating voltage.

22. A telemetering system including a transmitter and a receiver, a two-conductor transmission circuit connecting said transmitter and receiver, said transmitter including means to create a first undulating voltage of predetermined frequency and a second undulating voltage of the same frequency and in phase with said first mentioned undulating voltage, at least one of said undulating voltages being variable in amplitude, switching means operative at said predetermined frequency to impress said first mentioned undulating voltage on said transmission circuit during alternate half cycles of said undulating voltages and to impress said second mentioned undulating voltage on said transmission circuit during the other half cycles of said undulating voltages, an adjustable network included in said receiver responsive to the voltages impressed on said transmission circuit during the alternate half cycles to produce an undulating voltage of one phase or of opposite phase accordingly as the amplitude of the variable voltage increases or decreases from a predetermined amplitude depending upon the adjustment of said network, and means responsive to the phase of said last mentioned undulating voltage to adjust said adjustable network to reduce said last mentioned undulating voltage.

WALTER P. WILLS.